J. Easterly,
Furnace Grate Bar
N° 23,456.  Patented Apr. 5, 1859.
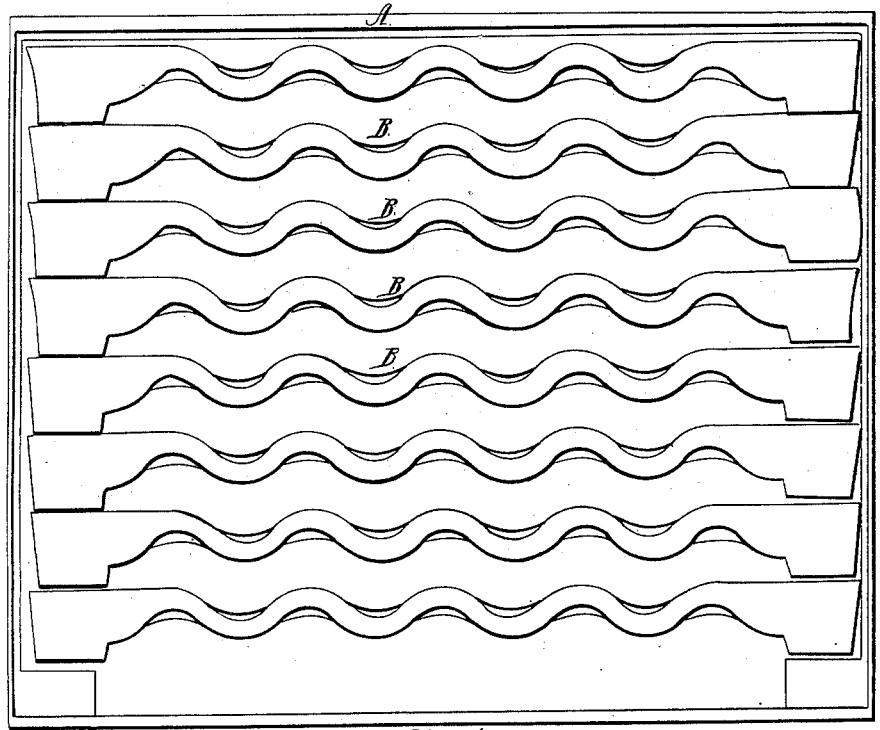
Fig. 1.
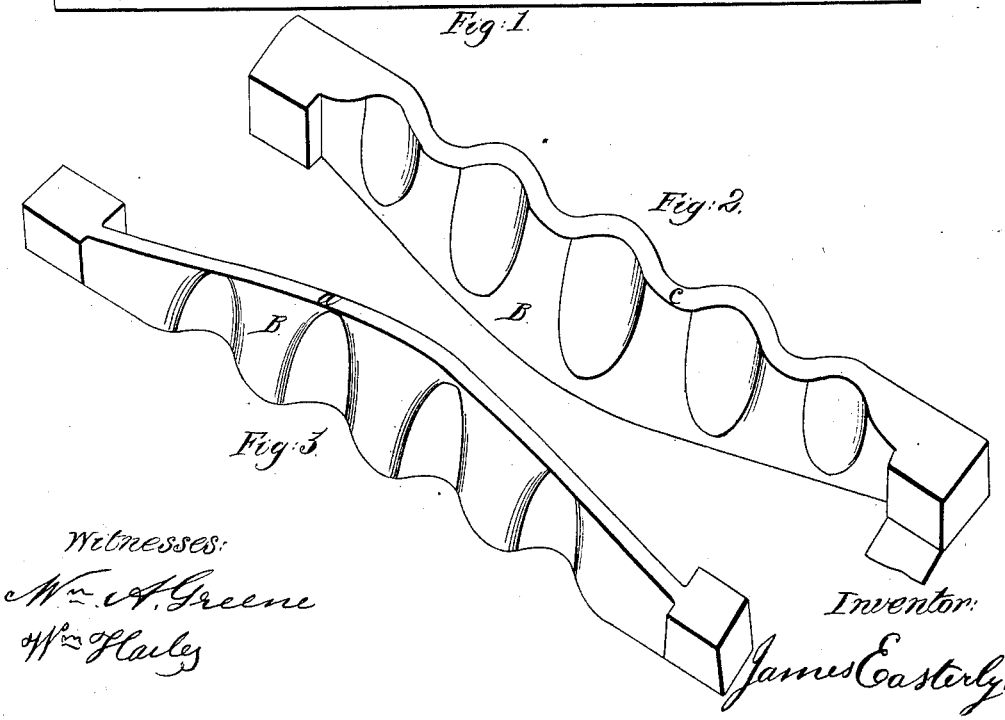
Fig. 2.
Fig. 3.
Witnesses:
Wm. A. Greene
Wm. Hailey
Inventor:
James Easterly

UNITED STATES PATENT OFFICE.

JAMES EASTERLY, OF ALBANY, NEW YORK.

GRATE-BAR.

Specification of Letters Patent No. 23,456, dated April 5, 1859.

*To all whom it may concern:*

Be it known that I, JAMES EASTERLY, of the county and city of Albany and State of New York, have invented certain new and useful Improvements in Grate-Bars; and I do hereby declare that the following is a full, clear, and exact description of the same, reference being had to the accompanying drawings and to the letters of reference marked thereon.

The nature of my invention consists in constructing grate bars with corrugations, substantially in the manner hereinafter described.

In the annexed drawings A, represents the frame in which the bars are placed for forming a grate.

B, B, represent the grate bars—these bars are made plane on their lower edge as is shown in Fig. 3, *a*, representing said edge—the tops or upper edges of the bars are corrugated—the corrugations extending down the sides of the bars almost to their bottoms. The ends of the bars are square and rest snugly in the frame in which they are placed.

There are two objects in making the bars corrugated as shown; one object is to introduce more air to the fire, which is effected by the irregularities of the bars. And another object is, make a bar which will accommodate itself to the unequal heat to which it is exposed and consequent unequal expansion. That portion of the bar is always most heated which is nearest the fire, and consequently expands most and so it is necessary to so construct a bar that its top edge will expand more than its lower edge. The air passing up cools the lower edge of the bar while the fire heats the upper edge. The corrugations of this bar are made with reference to the depth of the bar, and the consequent difference between the degrees of heat of the top and bottom—as the deeper the bar the less will be the heat below, and the more gradual may the corrugations be.

Having thus fully described my invention what I claim as new and desire to secure by Letters Patent is—

The within described corrugated grate bar, constructed substantially in the manner and for the purpose specified.

JAMES EASTERLY.

Witnesses:
WM. A. GREENE,
WM. HAILEY.